May 24, 1938.                G. NEUMANN                2,118,518
                      DISTANCE MEASURING SYSTEM
                      Filed Sept. 27, 1935         4 Sheets-Sheet 4
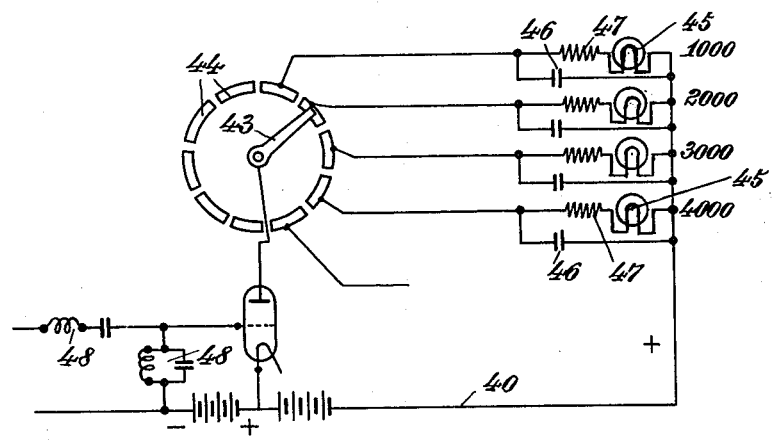
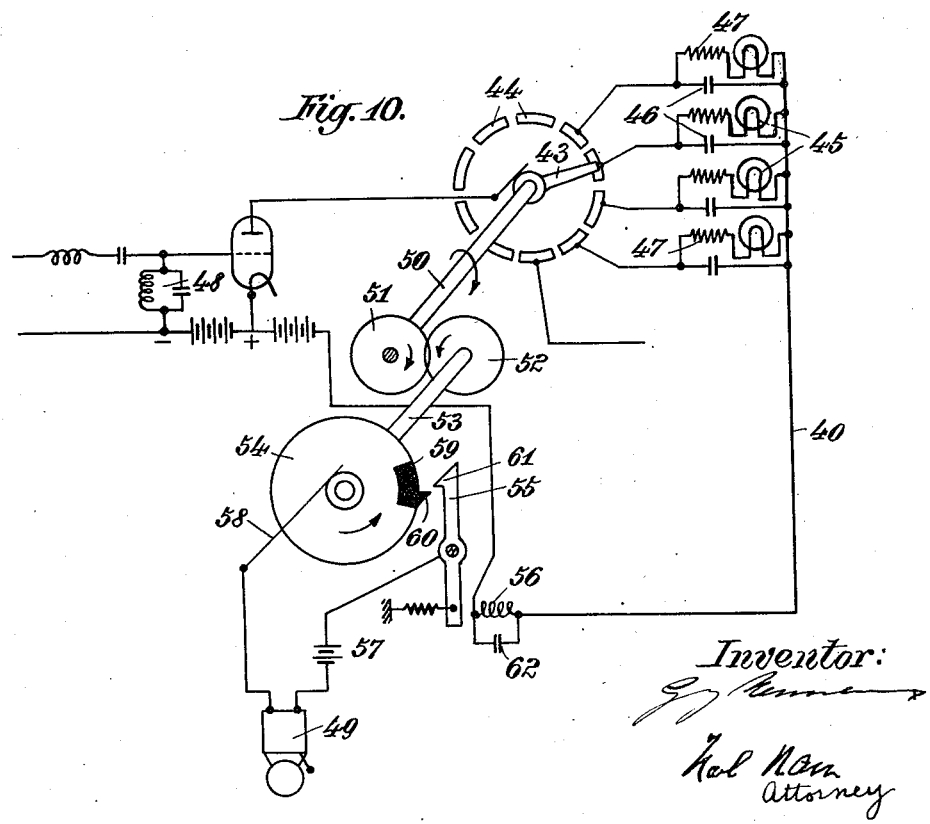

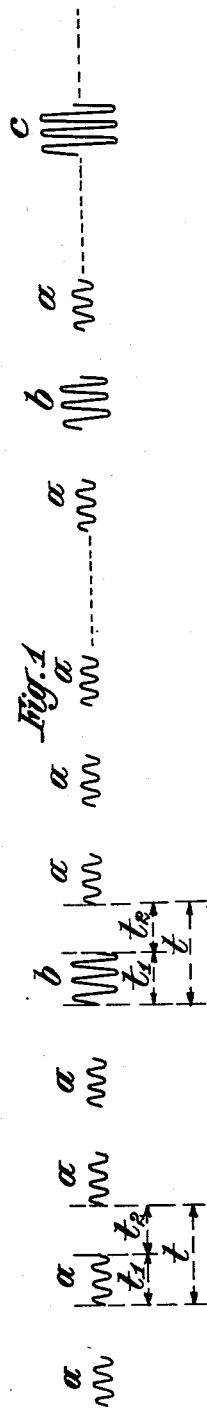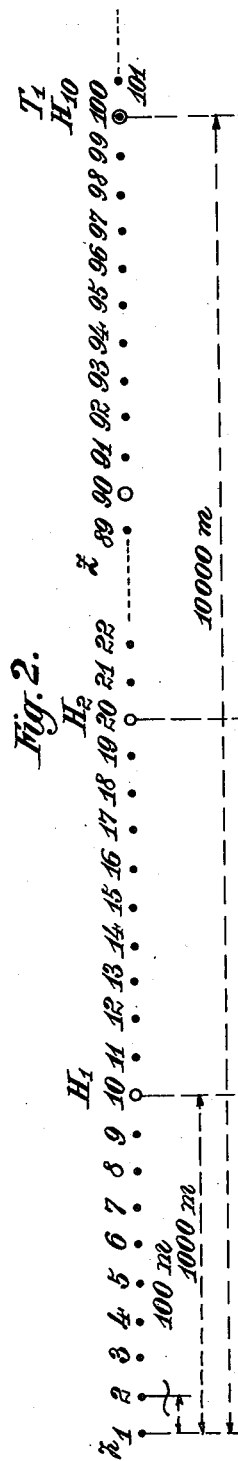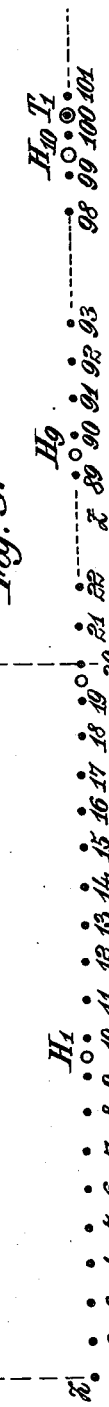

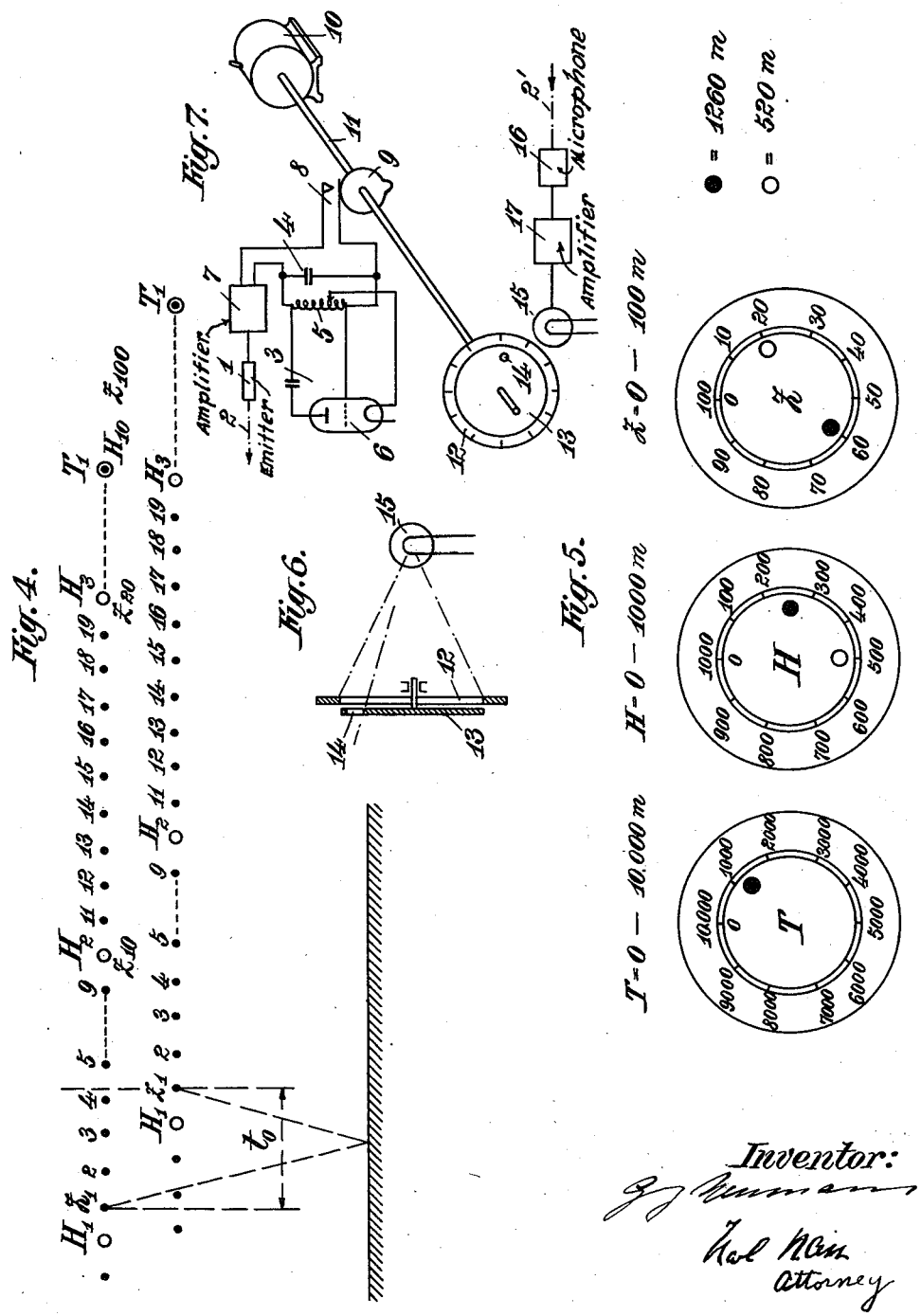

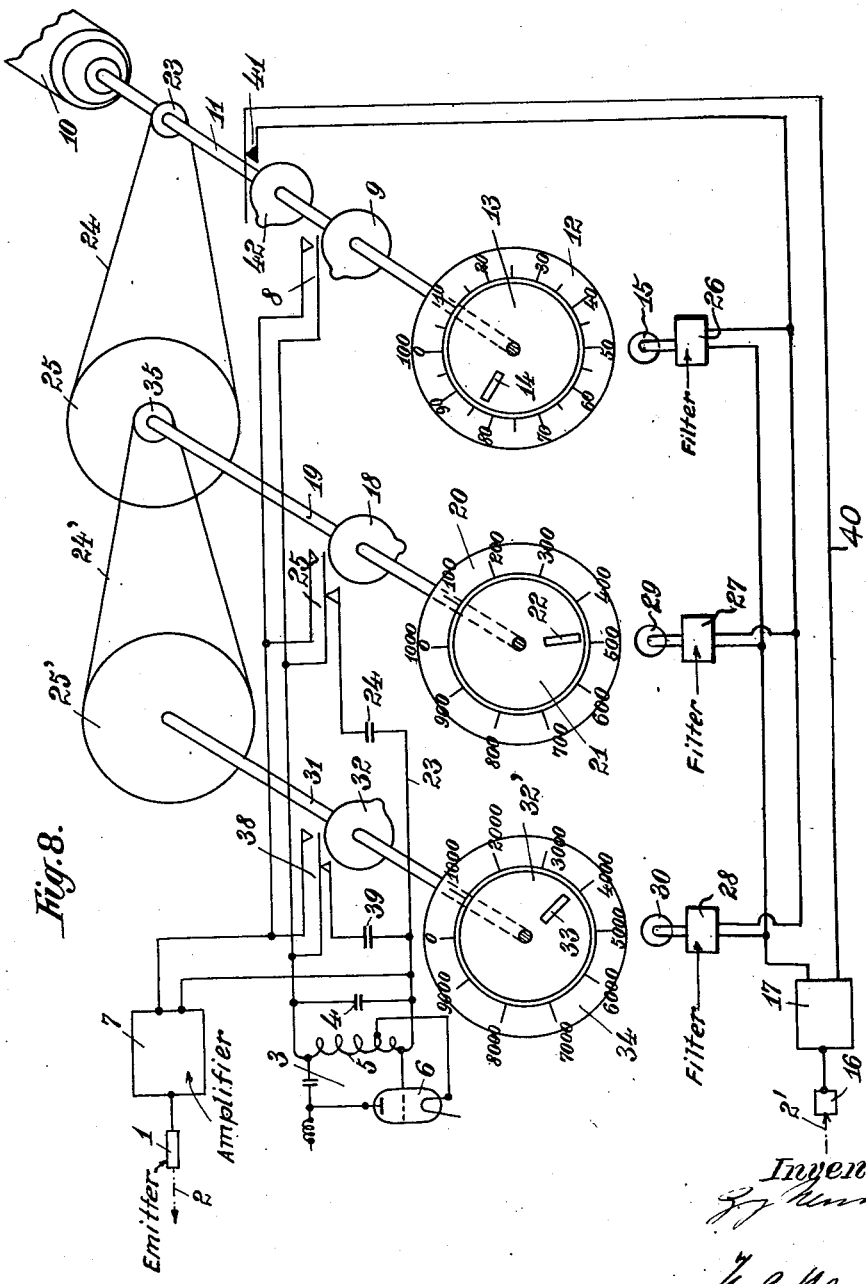

Patented May 24, 1938

2,118,518

UNITED STATES PATENT OFFICE 2,118,518

DISTANCE MEASURING SYSTEM

Georg Neumann, Berlin, Germany

Application September 27, 1935, Serial No. 42,515
In Germany December 30, 1933

6 Claims. (Cl. 177—386)

The present invention relates to methods and apparatus for determining distances by means of electric or acoustic waves transmitted to and reflected from a point whose distance it is desired to measure.

More specifically, the invention is concerned with a method of and apparatus for distance measurement by generating a series of wave impulses at one point, transmitting the impulses to a distant point or object and measuring the time taken by the impulses in travelling the echo path to and from the distant point.

In the practical application of distance measuring apparatus of the aforementioned general character, a continuous indication is obtained by the provision of an indicator comprising a scale calibrated in distance units cooperating with a suitable index member. The index member and scale move at a constant relative speed starting from a predetermined position coinciding with the instant of emission of a measuring impulse. The distance may be directly read on the scale when a signal is produced by an arriving echo impulse such as a light signal illuminating the index member and the associate member on the distance scale. By using impulses following each other in sufficiently rapid succession, a clear and continuous indication is obtained owing to the persistence of vision of the human eye.

An object of the invention is to obtain a simple method for and means of distance measurement of the above described character which is highly efficient and reliable in operation and enables a direct reading of the distance to be determined within narrow limits and with a desired accuracy. Another object is the provision of a method of and means for distance measurement of the above character wherein the distance is severally indicated in units of different orders of magnitude correlated with each other such as on a decimal basis to increase the accuracy and ease of reading.

Further objects and features of the invention will be evident from the description of the method employed to obtain the desired result and the description of the apparatus used, several embodiments of which are described hereafter with reference to the accompanying drawings in which:

Figures 1 to 3 are diagrams illustrating different forms of measuring impulses and methods of transmitting same in accordance with the invention.

Figure 4 is a diagram showing the relation of transmitting and receiving impulses.

Figure 5 is a diagrammatic illustration of an indicating system according to the invention.

Figure 6 is a cross-section of an indicator shown in Figure 5.

Figure 7 is a diagram representing one form of a transmitting and receiving system according to the invention.

Figure 8 is a modification of a system according to Figure 7 embodying a multiple transmitter and indicator in accordance with the invention.

Figure 9 represents a modified partial construction of a system according to Figure 8.

Figure 10 represents a modification of an arrangement shown in Figure 9.

With the above and further objects in view, the invention generally involves the provision of a method and means for transmitting correlated sets of measuring impulses of different predetermined characteristics such as frequency or amplitude and for segregating the received impulses to operate a multiple indicator.

In order to ensure a high degree of accuracy of measurement, it is essential that the intervals between successive measuring impulses be extremely short. Thus, referring to Figure 1 of the drawings, the time $t_1$ representing the length or duration of an impulse $a$ having the form of a wave train which may be either acoustic or electric, may be 1/1000th of a second; the time $t_2$ representing the interval between successive impulses being substantially longer, such as $\frac{1}{10}$th of a second. The impulses $a$ of uniform length and constant frequency are emitted continuously and received in the same succession in the receiver after reflection from the distant point provided the distance remains constant.

In order to simplify the reading and measurement at the receiver in accordance with the invention, secondary or differentiating impulses $b$ are transmitted in the example shown after every 9th primary impulse $a$. Differentiating impulses of still higher order may be interposed in any convenient number between the primary impulses such as for each 10th impulse $b$ an impulse $c$ having a characteristic differing from both the impulses $a$ and $b$ may be transmitted, provided that the distance to be measured is greater than the distance corresponding to the distance range encompassed by the impulses of the highest order provided.

Referring to Figure 2, the dots and circles shown represent impulses or trains of measuring waves of primary (Z), secondary (H) and third (T) order corresponding to $a$, $b$ and $c$, respectively, in Figure 1. The intervals between successive impulses, such as $Z_1$—$Z_2$, $Z_2$—$Z_3$, etc., are chosen in such a manner with regard to the velocity of propagation through the medium of transmission such as water that they correspond to definite fixed units such as to 100, 1000 and 10,000 meters chosen in the example illustrated. In the latter case, the impulses or trains of differentiating waves $H_1$, $H_2$, $H_3$ shown in Figure 2 represent the "hundred" units and the differentiating wave trains $T_1$, $T_2$, $T_3$ represent the "thousand" units. In the example according to Figure 2, the trains of differentiating waves $H_1$, $H_2$, etc. and $T_1$, $T_2$, etc., coincide with the primary wave trains $Z_1$, $Z_{10}$, $Z_{20}$, ... or $Z_{100}$, $Z_{200}$, etc., respectively. According to a modified arrangement as shown in Figure 3, the differentiating wave trains are interposed between successive primary trains such as between $Z_9$ and $Z_{10}$, $Z_{19}$ and $Z_{20}$, etc. In the latter case, two differentiating signals $H_1$ and $T_1$ will be emitted between $Z_{99}$ and $Z_{100}$.

If the distance between the transmitter and the reflecting surface remains constant, the separate transmitting impulses will return to the receiver in regular succession but displaced by a constant time interval $t_0$ as shown in Figure 4. If, on the other hand, the distance from surface to be sounded varies, the individual impulses will return at different time intervals $t_0$. The use of differentiating impulses $H_1$, $H_2$, $T_1$, $T_2$, etc., makes it possible to determine the interval between the arrival of an impulse at the receiver and the instant of transmission with increased ease and accuracy for any desired distance.

In Figure 4, wherein the upper row represents the transmitting impulses and the lower row represents the receiving impulses the intervals between successive impulses or trains of emission waves $Z_1$—$Z_2$, $Z_2$—$Z_3$, etc., correspond to a distance of 100 meters according to the example above given, that is, the interval between $Z_1$—$Z_{10}$ corresponds to 1000 meters, the intervals between $H_1$—$H_2$, $H_2$—$H_3$, etc., correspond to 1000 meters each and the interval between $H_1$—$H_{10}$ corresponds to a distance of 10,000 meters. In the example shown, the impulse $Z_1$ returns to the receiver at an instant between the transmission impulses $Z_4$ and $Z_5$. Assuming that the distance between the point $Z_1$ in the lower row and $Z_4$ in the upper row corresponds to 30 meters, it is seen that the distance from the reflecting point is equal by 4 "hundred" units (i. e. equal to 400 meters) plus 3 "ten" units (i. e. equal to 30 meters) or a total of 430 meters. Moreover, since the last differentiating impulse $H_1$ may be determined in a simple manner, i. e. in the example chosen corresponding to 1000 meters, it follows that the measured distance is equal to 1430 meters. If, in the example chosen, this distance exceeds 10,000 meters, the train of reflected waves is registered on the indicator within the range following the differentiating wave train $T_1$ corresponding to 10,000 meters.

As pointed out, the impulses or trains H and T may be sent out between successive primary trains or impulses Z or simultaneously during the emission of the primary impulses. In the latter case, the primary wave trains Z are emitted simultaneously with the differentiating trains H and T. In order to avoid the use of several transmitters, the primary wave trains Z and the differentiating waves H and T may be sent in quick succession, i. e. the latter during the intervals between the former.

The impulses may be transmitted by controlling an electric or mechanical transmitter. Thus, in the case of an electrical transmitter, a fundamental frequency may be used for the primary impulses and modulated to produce the differentiating signals. The time interval $t$ between two wave trains may be equal to 4/30 of a second, which in the case of sound transmitted through water corresponds to a distance to and from the reflecting point equal to 100 meters, the velocity of sound through water being equal to 1500 meters per second as is well known. If the measurement is to be accurate within two meters, the time $t$ of the length of the transmitting impulses should be 2/100 of the total period of 4/30 of a second, i. e. equal to 8/3000 of a second.

Any suitable type of mechanical and electrical transmitter such as a mechanical impulse transmitter or an electric oscillator and receiver may be employed for the purposes of the invention.

Figure 5 illustrates a simple and easily readable multiple indicator adapted for use in a system as described hereinbefore. The indicating devices for the three groups or sets of impulses are arranged side by side to facilitate the reading thereof. The scale divisions shown are on a decimal basis and correspond to the example described previously.

Figure 6 shows a cross-section of a single indicator comprising a scale mounted upon a fixed rear plate 12 in front of which is arranged a rotating disc 13 provided with a slot 14. A source of light shown at 15 is mounted in the rear of plate 12. The speed of rotation of the disc 13 corresponds to the frequency of the impulses Z, H, or T, respectively, and depends on the velocity of propagation through the transmitting medium; that is, 1500 meters per second in the case of sound waves transmitted through water. Alternatively, a stationary disc 12 may be used and the source of light 15 rotated relative thereto.

Each impulse arriving at the receiver is used to light up an indicating lamp 15 whereby the distance may be read directly by the number on the disc 12 opposite the illuminated slot 14.

In the example shown in Figure 5, the distance measured is 1260 meters. As is understood, this figure could be read roughly directly on the scale T (range 1 to 10,000 meters); in order to secure increased accuracy and ease of reading the "hundred" units are read on the H scale (range 1 to 1000 meters) and the decimal and single units on the Z scale (range 1 to 100 meters). The reading is easily carried out by noting on each scale 12 the numeral immediately behind the light slot 14 beginning with the T scale; that is, in the example shown numeral 1000 on the T scale, numeral 200 on the H scale, and numeral 60 on the Z scale. These figures are added like the digits in a decimal system giving a total of 1260 meters in the example illustrated.

If a shorter distance is to be recorded, the lamp 15 will light up twice during a single revolution of the disc or source of light. Thus, assuming the distance to be 520 meters, the illuminated slot on the H scale will be visible somewhat beyond the numeral 500 and the numeral 20 will be visible on the Z scale. It is understood that the indicators should be operated in synchronism with the transmitting impulses. This can be effected by mounting the indicators on a common shaft and employing a suitable gear mechanism or by using synchronous motors as a driving means. If the velocity of propagation varies, the speed of the separate indicators should be altered accordingly, such as by adjusting the speed of a common drive or prime mover.

The indicator shown in Figure 5 with three graduated scales may be combined into a single unit in such a manner that the discs 14 are mounted one above the other upon a common hollow shaft and driven by a suitable driving mechanism. The intervals between the separate impulses depend on the velocity of propagation of the waves used through the specific carrier medium as pointed out previously.

Referring to Figure 7, this illustrates a simple arrangement for transmitting and receiving correlated multiple impulses according to the invention. The wave trains or impulses 2 emitted from a suitable radiator or emitter 1 are generated by means of an electrical oscillator shown at 3 of the vacuum tube type comprising a tube 6 and an oscillatory circuit comprised of a condenser 4 and an inductance coil 5 in parallel to the condenser. The circuit 4, 5 is connected to the tube 6 in regenerative circuit arrangement in a known manner to produce self-sustained oscillations of definite frequency determined by the self-inductance of the coil 5 and the capacity of the condenser 4. The oscillations are applied to the transmitter 1 through an amplifier shown at 7. The impulses are produced by an interrupting device or switch 8 included in the connecting lead between the oscillator and amplifier 7.

In the example illustrated, the interrupter 8 is actuated by a cam 9 driven by the shaft 11 of a suitable prime mover of constant speed such as a motor 10. The latter also serves to rotate the indicator consisting in the example shown of a fixed annular scale 12 and a rotating index disc 13 mounted upon the shaft 11 and provided with an indicating slot 14. The indicating lamp 15 is mounted behind the scale in the manner described in connection with Figure 6.

The received impulses 2' reflected from the distant object are picked up by a microphone 16 or similar receiver, amplified by means of an amplifier 17 and applied to the lamp 15.

As a result of the synchronism between cam 9 and the indicator 13, the slot 14 is illuminated by the lamp 15 each time an impulse strikes the receiver 16 in such a manner that the position of the slot is definitely related to the distance travelled. In this manner the position of the slot when illuminated by the lamp 15 enables a direct reading of the distance measured.

Figure 8 illustrates a system for transmitting several types of impulses correlated with each other on a decimal basis in the manner described and received by an indicator of the type illustrated by Figure 5. According to Figure 8, the emission of the differentiating impulses is likewise effected by means of an apparatus similar as shown in Figure 7. In addition to Figure 7, the system of Figure 8 includes a further cam 18 mounted upon a shaft 19 also driven by the motor 10 and carrying an indicator comprising a stationary scale 20 and a rotary disc 21 rotated by the shaft 19 and having an indicating slot 22.

In the practical application of the system of this type, it is advisable to use a transmission ratio on a decimal basis as described hereinbefore. In the example shown, the transmission is effected by means of a pulley drive comprising a pulley 23 mounted upon shaft 11, a pulley 25 mounted upon shaft 19, and an endless transmission wire or cord 24. In place of a pulley drive, any other transmission mechanism may be employed, such as a gear or chain drive or the like. The ratio between the diameters of the pulleys 23 and 25 is equal to 1:10 when employing a decimal system or in other words, the disc 13 makes 10 revolutions for each revolution of the disc 21. This ratio enables the scale 12 to be calibrated for distances from 1 to 100 meters and the scale 20 to be calibrated for distances from 1 to 1000 meters provided the speed of rotation of the motor 10 is properly chosen in relation to the speed of propagation of the impulses through the transmission medium. In such a system distances from 1 to 1000 meters can be determined with an increased ease of reading and accuracy.

The emission of the differentiating impulses by the cam 18 is effected as follows. When cam 18 is out of engagement with the switch 25, as shown in the drawings, a condenser 24 is connected in parallel to the condenser 4 of the oscillator, thus determining a definite frequency of the oscillations generated by the latter. When the cam 18 engages the switch 25, the condenser 24 is disconnected from the oscillator circuit by the opening of the lower contact of the switch 25 and the oscillating circuit 4, 5 is connected to the transmitter 1 through the amplifier 7 by the closing of the upper contact of the switch 25. In this manner differentiating impulses of a different frequency are transmitted in a manner similar as described in Figure 7. After the cam 18 is disengaged from the switch 25, the tuning condenser 24 is again connected to the oscillator circuit.

In order to differentiate between primary and differentiating wave trains in the receiver the receiving apparatus includes a plurality of electric filters each associated with one of the separate indicators. These filters are designed in such a manner that only primary wave trains or impulses will pass through the filter 26 and operate the indicator lamp 15 and that differentiating impulses will be admitted only by the filters 27 and 28 having different frequency response characteristics and control the indicating lamps 29 and 30, respectively, without interfering with the other indicators. The filter 28 and the indicating lamp 30 are associated with a third indicator similar as shown in Figure 8. The latter is operated by a shaft 31 coupled with the shaft 19 through a pulley drive comprising the pulley 35 mounted upon the shaft 19, a pulley 25' mounted upon the shaft 31, and a transmission cord 24'. The shaft 31 carries an indicating disc 32' provided with a slot 33 and cooperating with a fixed graduated scale 34 similar as described before. The transmission ratio between the shafts 19 and 31 is again chosen according to the decimal system in such a manner that shaft 19 describes 10 revolutions for each revolution of the shaft 31 or in other words, shaft 11 describes 100 revolutions for each revolution of the shaft 31.

It is understood that the shaft 31 could be directly driven from the shaft 11 through a suitable driving mechanism. A cam 32 carried by shaft 31 serves to control the differentiating impulses differing from the differentiating impulses controlled by the cam 18 and generated at intervals of each group of 100 impulses produced by the cam 9. This second type of differentiating impulses is produced in the same manner as in the case of cam 18 by the actuation of a switch 38 of similar type to the switch 25 adapted to connect and disconnect a condenser 39 arranged in parallel to condenser 4 of the oscillator and to close and interrupt the connection from the oscillator to the transmitter 1. Under normal conditions, when the cam 32 is disengaged from the switch 38, condenser 39 is connected to the oscillatory circuit thus determining the fundamental frequency of the oscillator. When the cam 18 engages switch 25 and differentiating impulses of the first order are generated, the condenser 39 is connected to the oscillatory circuit while the condenser 24 is disconnected from the oscillator and vice versa, when the switch 38 is engaged by the cam 32 the condenser 24 is connected to the oscillatory circuit and the condenser 39 is disconnected from the oscillator. The two condensers 24 and 39 are of different capacity so as to secure differentiating wave trains of different frequency which can be easily segregated in the receiver by means of filters as described. Thus, the filter 28 is constructed in such a manner as to afford free passage to the indicator 30 for the differentiating wave train controlled by the cam 32 and switch 38, while the filters 26 and 27 are effective in blocking the passage of this wave and operation of the lamps 15 and 29.

In view of the transmission ratio of 1:100 between the shafts 9 and 31, the scale associated with the cam 32 indicates the distances from 1 to 10,000 meters. If still greater distances are to be measured, further impulse control devices and indicators may be added properly related on a decimal basis as will be understood.

The cams 9, 18 and 32 may be displaced relatively in such a manner that the differentiating impulses are transmitted during the intervals shortly before and after the primary impulse, such as shown in Figure 3.

Difficulties may arise due to the fact that impulses emitted by the transmitter 1 may directly affect the receiver 16, thus causing the lamps 15, 29 and 30 to light up and interfere with the proper operation of the system. According to a feature of this invention, this drawback is obviated by the provision of an interrupter or commutator connected in the receiving circuit and operated such as by a cam 42 mounted on the shaft 11, in the example illustrated. Thus, the interrupter 41 is momentarily opened during each rotation of the cam thereby opening and closing the receiving circuit. If the two cams 9 and 42 mounted on the shaft 11 are in exact alignment, the actuation of the switch 8 and in turn the generation of the transmission impulse simultaneously produces an opening of the receiving circuit 40. In this manner, a direct reception of the impulses immediately after emission is prevented in the receiver 16. If the transmitter 1 and the receiver 16 are spaced at a distance from each other, a phase difference dependent on the spacing and velocity of propagation may occur which may be compensated by a corresponding relative displacement of the cams 9 and 42 in such a manner that the interrupter 41 is opened at the exact moment when the direct wave train from the transmitter reaches the microphone or receiver 16.

If the period of illumination is too short, that is, if the duration of the impulses is not sufficient to effect proper lighting of the indicator, so as to prevent easy reading of the scales, a suitable retarding or delay device may be provided in accordance with a further feature of the invention. In this case, however, it is advisable to use a plurality of indicator lamps one for each scale division.

A device of this type is shown diagrammatically in Figure 9. In place of the revolving indicating disc a sliding contact arm 43 is provided mounted upon each of the shafts 11, 19 and 31. The arrangement shown in Figure 9 corresponds to that of the shaft 31 in Figure 8 and is substantially the same for the other transmitters and indicators. The contact arm 43 is arranged to move over a circularly arranged bank of cooperating contacts 44. Each of the latter contacts is connected to an indicating lamp in such a manner that the arm 43 passes from one contact to the next contact corresponding to a definite distance travelled by the measuring impulse, such as 1000 meters in the example shown. In this manner, the distance measured is clearly indicated by the particular lamp 45 lit by the receiving impulses. In order to ensure reliable operation, either the contacts 44 are made of sufficient width or an electrical retarding device is inserted in the separate lamp circuits. In the example shown, the retarding is obtained by means of a condenser 46 connected in parallel to each lamp 45 and series resistance 47. In order to prevent mutual interference between the impulses coordinated to the separate indicators, suitable filters are connected in the receiving circuits in the manner described previously. In the example according to Figure 9, a stop filter 48 of known construction is connected in the input circuit of the indicator. The number of the lamps 45 and accordingly of the contacts 44 may be selected in any desired manner to secure a desired degree of accuracy.

When using an arrangement of the type described, it may be desirable to produce an acoustic signal in addition to the optical indication. For the latter purpose an alarm 49 is inserted in the receiving circuit 40.

If it is desired to secure a selective operation of the acoustic alarm, that is, for certain distances, or sudden changes in distance, an arrangement of the type shown in Figure 10 may be employed.

Referring to Figure 10, the shaft 50 corresponding to any of the shafts 9, 19 or 31 according to Figure 8 has mounted upon it a friction wheel 51 driving a second friction wheel 52. Shaft 53 connected to the friction wheel 52 carries a circular contact member cooperating with a pivotally mounted contact lever or armature 55 mounted opposite thereto. The lever 55 is actuated by a magnet having a winding 56 included in the receiving circuit 40 whereby the armature is attracted whenever a current impulse is received in the circuit 40. Thus, when the lever is attracted against the contact disc 54, a circuit of a local battery 57 including the alarm 49 is closed and the alarm operated.

The operation of the arrangement is as follows. When a reflected impulse 2' arrives, the lever 55 is attracted by the relay magnet and its upper end moved into engagement with the circular disc 54 thus closing the circuit and operating the alarm. The disc 54 is provided with an insulating section 59. Thus, if the lever 55 engages the insulated section 59 corresponding to a predetermined position of the contact arm 43, and in turn to a definite distance measured, the actuation of the alarm is prevented. As soon as the distance changes, the alarm is sounded thus apprising the operator of the change. As is understood, exact synchronism is required in this case between the contact discs 54 and rotating contact arm 53, or a transmission ratio 1:1 between the friction discs 51 and 52.

The insulating section 59 of the contact disc 54 may be adjusted relative to the contact arm 53 in such a manner that its position is opposite the lever 55 at a predetermined position of the contact arm 44 at which actuation of the alarm is prevented. Thus, as pointed out, as soon as a distance change occurs, that is, if the impulse is produced through a different contact element 44 the insulating section 59 is no longer opposite the lever 55 when the latter is attracted by the relay 56 whereby the alarm circuit is closed and the alarm operated.

If during the measurement, the mean distance varies from the distance for which the indicator has been adjusted, it will be necessary to readjust the position of the contact arm 43 relative to the insulating section 59 manually to prevent the actuation of the alarm under the new condition.

In order to effect the adjustment of the mean position automatically, the insulating section 59 is provided with a nose 60 adapted to engage nose 61 of the lever 55. Moreover, a leading movement is imparted to the contact disc 54 relative to the contact arm 43 such as by giving the friction wheel 52 a somewhat smaller diameter than the wheel 51. In addition, the release of the lever 55 is retarded such as by means of a condenser 62 connected in parallel to the relay winding 56. The degree of retardation depends on the transmission ratio between the discs 51—52 and the speed of rotation of the contact arm 43 or in turn, the intervals between successive measuring impulses.

The operation is as follows: If the arm 43 receives an impulse the lever 55 is attracted until its nose engages the insulating section 59. The disc 54 continues to rotate until its nose 60 engages nose 61 of lever 55 and is retained in this position until the lever 55 is released determined by the delay action of the condenser 62. After the nose 60 has been released, the disc continues to rotate through the friction drive 51—52. On account of the lead of the disc 54, the lever 55 is actuated by the receiving impulses prior to the instant when the nose 60 engages the nose 61 in such a manner that the lever engages the insulating section 59 before striking the nose 60. In this manner the disc 54 is held for a short period during each revolution by its nose 60 engaging the nose 61 of the lever 55, thereby compensating for the lead of the disc relative to the arm 43 and causing attraction of the lever 55 against the insulating section 59 of the disc 54 during each revolution in case that the average distance measured remains constant. Thus, with a constant means distance, the acoustic alarm is prevented from operating despite the lead of the disc 54 due to the fact that this lead is compensated after each revolution of the disc 54 by the delayed release of the lever 55.

If the distance measured changes and as a result the lever 55 is attracted against the conducting section of the disc 54, and provided the distance change persists for a sufficient period of time, the disc will no longer be held by the nose of the lever 55 during each revolution and consequently will advance gradually until after a definite number of revolutions the lever is again attracted against the insulating section 59 of the disc 54 whereby the system has adjusted itself automatically to the new mean distance. The operation of the alarm will now be prevented until a renewed and continued change of distance has taken place. An arrangement of this type constitutes a simple means for indicating not only changes in distance, but for drawing conclusions with regard to new conditions to be expected.

As is understood, the length of the measuring impulse determines the duration of the actuation of the indicator and the width of the slots 14, 22 and 33 according to Figure 8 may be chosen to conform to any desired impulse length. It is further understood that in place of the arrangement described, equivalent devices may be provided for the purpose of the invention. Thus, for instance, in place of a single driving motor 10 with a transmission mechanism for operating the cam shafts and indicators, separate synchronous motors may be used for each impulse generator and associate indicator, and in place of a common oscillator with several tuning condensers connected and disconnected in the manner described, separate independent oscillators could be provided properly tuned and controlled in an analogous manner as disclosed.

While I have shown the invention embodied in the specific constructions exemplified in the drawings, it will be obvious that the same is susceptible of various modifications differing from those shown and described herein for illustration and coming within its broader scope and spirit as expressed by the ensuing claims.

I claim:

1. A distance measuring system comprising means for transmitting primary measuring impulses to a distant object, said impulses following each other in regular sequence at a predetermined frequency, means for transmitting secondary measuring impulses to said object, said secondary impulses having a different characteristic from said primary impulses and following each other in regular sequence at a frequency having a ratio of 10:1 to the frequency of the primary impulses, means for selectively and separately receiving said primary and secondary impulses after reflection from said object, indicating means for both primary and secondary received impulses, each of said indicating means comprising a scale calibrated in distance units, also having a ratio 10:1 corresponding to the frequency of the respective received measuring impulses, said scales being arranged adjacent to each other for simultaneous reading by an observer, index members cooperating with each of said scales, means for varying the relative position of each of said index members and the associated scale in proportion with the progress of and in synchronism with the frequency of the coordinated measuring impulses and signaling means for indicating reception of the impulses by each of said receiving means.

2. In a distance measuring system, a wave generator, an emitter, periodically operated switching means interposed between said generator and said emitter for simultaneously transmitting a plurality of groups of measuring wave impulses in regular sequence to an object whose distance is to be determined, means whereby the impulses of each group have a different characteristic, each successive group of impulses having a frequency equal to $\frac{1}{10}$th the frequency of the preceding group, means for separately selectively detecting the impulses of each group received after reflection from said object, indicators for each group of received impulses arranged side by side and in the order of successive groups of received impulses for simultaneous reading by an observer, said indicators having scales calibrated in distance units having ratios of 1:10 corresponding to the frequency of the respective group of received impulses, index means associated with each of said scales, means for gradually varying the relative position between each of said scales and the associated index means in synchronism with the frequency of the respective groups of received impulses, and signalling means associated with each of said indicators for indicating the received impulses, whereby the distance travelled by said impulses to and from said object may be read in a plurality of successive units related according to the decimal number system.

3. In a distance measuring system, means for producing and transmitting to a distant object a plurality of groups of measuring wave impulses following each other in regular sequence, each group having a different characteristic, each successive group of impulses having a frequency equal to $\frac{1}{10}$th the frequency of the preceding group, means for separately selectively detecting the impulses of each of said groups received after reflection from said object, indicating means associated with the detecting means for each group of received impulses, each of said indicating means having a scale calibrated in distance units related in ratios of 10:1 corresponding to the frequency of the respective received impulses, index means arranged to cooperate with each of said scales, said scales and associated index means being arranged side by side with the distance units of successive scales decreasing in ratios of 10:1 from left to right, means for gradually varying the relative position between each of said scales and associated index means in synchronism with the frequency of the respective groups of received impulses, and signalling means associated with each of said indicating means for indicating the arrival of a received impulse, whereby the distance travelled by the impulses to and from said object may be read in a plurality of successive units related according to the decimal number system.

4. In a distance measuring system, means for producing and transmitting to a distant object a plurality of groups of electric impulses following each other in regular sequence, each group of impulses having a different characteristic, the frequency of each successive group of impulses being equal to $\frac{1}{10}$th the frequency of the preceding group, means for separately selectively detecting the impulses of each group received after reflection from said object, a plurality of indicators having scales and index means for each of said detecting means arranged to operate synchronously with the frequency of the respective groups of received impulses and adapted to indicate the distance travelled by the impulses to and from said object, said indicators being arranged side by side with their indicating scale units decreasing in ratios of 10:1 from left to right, whereby the distance of said object may be read in a plurality of successive units related according to the decimal number system.

5. In a system as claimed in claim 4 in which said first means is comprised of an electric oscillator and a plurality of periodic switching means connected therewith, each of said switching means adapted to connect and disconnect said oscillator and simultaneously change a frequency determining element of said oscillator to produce groups of transmitting wave impulses each having a different frequency.

6. In combination; a plurality of distance measuring systems, each of said systems comprising means for transmitting measuring wave impulses to an object whose distance is to be determined, the impulses of each system following each other in regular sequence and having different characteristics, the frequency of the impulses of successive systems being related in ratios of 10:1, receiving means for each of said systems adapted to detect the respective impulses received after reflection from said object, individual indicators for said receiving means, said indicators being arranged to operate synchronously with the frequency of the respective received impulses to indicate the distance travelled by said impulses to and from said object in different units related according to ratios of 10:1, the indicators of successive receiving means being arranged side by side to enable simultaneous reading of the distance in successive units related according to the decimal number system.

GEORG NEUMANN.